United States Patent [19]

Perry et al.

[11] Patent Number: 5,214,123
[45] Date of Patent: May 25, 1993

[54] PREPARATION OF AROMATIC POLY(IMIDE-AMIDE)S FROM CO, PRIMARY DIAMINE AND DI(TRIFLUORO METHANE SULFONATE) CONTAINING PHTHALIMIDE GROUP

[75] Inventors: Robert J. Perry; S. Richard Turner, both of Pittsford; Richard W. Blevins, Rochester, all of N.Y.

[73] Assignee: Eastman Kodak Company, Rochester, N.Y.

[21] Appl. No.: 841,926

[22] Filed: Feb. 25, 1992

[51] Int. Cl.$^5$ .............................................. C08G 73/10
[52] U.S. Cl. ..................................... 528/321; 528/15; 528/25; 528/33; 528/125; 528/126; 528/128; 528/168; 528/170; 528/220; 528/225; 528/312; 528/319; 528/322; 528/391
[58] Field of Search .................... 528/321, 322, 15, 25, 528/33, 125, 128, 126, 168, 170, 312, 319, 391, 220, 225

[56] References Cited

U.S. PATENT DOCUMENTS

| | | |
|---|---|---|
| 4,165,332 | 8/1979 | Beard et al. . |
| 4,621,149 | 11/1986 | Fukuoka et al. . |
| 4,801,744 | 1/1989 | Herman et al. ..................... 528/422 |
| 4,868,271 | 9/1989 | Dahl et al. . |
| 4,894,431 | 1/1990 | Armbruster et al. . |
| 4,925,916 | 5/1990 | Harris et al. . |
| 4,933,419 | 6/1990 | Perry et al. . |
| 4,933,466 | 6/1990 | Perry et al. . |
| 4,933,467 | 6/1990 | Perry et al. . |
| 4,933,468 | 6/1990 | Perry et al. . |

FOREIGN PATENT DOCUMENTS

| | | |
|---|---|---|
| 3431591 | 3/1986 | Fed. Rep. of Germany . |
| 1299256 | 4/1989 | Japan . |
| 123823 | 5/1989 | Japan . |

OTHER PUBLICATIONS

Yoneyama, M. et al., "Novel Synthesis of Aromatic Polyamides by Pd-Catalyzed Polycondensation of Aromatic Dibromides, Aromatic Diamines, and Carbon Monoxide", (1988), *Macromolecules*, vol. 21, pp. 1908-1911.
Cacchi, S. et al., "Pd-Catalyzed Carbonylation of Aryl Triflates, Synthesis of Arenecarboxylic Acid Derivatives from Phenols", (1986), *Tetrahedron Letters*, vol. 27, No. 33, pp. 3931-3934.
Cacchi, S. et al., Pd-Catalyzed Carbonylation of Enol Triflates, A Novel Method for One-Carbon Homologation of Ketones to Alpha,Beta-Unsaturated Carboxylic Acid Derivatives, (1985), *Tetrahedron Letters*, vol. 26, No. 8, pp. 1109-1112.
Aoki, S. et al., "Synthesis of 1,4-Dicarbonyl Compounds by Palladium-Catalyzed Carbonylative Arylation of Siloxycyclopropanes", Synlett, Dec. 1990, pp. 741-742.
Chen, Q-Y, "Pd-Catalyzed Reaction of Phenyl Fluoroalkanesulfonates with Alkynes and Alkenes", (1986), *Tetrahedron Letters*, vol. 27, No. 10, pp. 1171-1174.
Dolle, R. E. et al., "Palladium Catalyzed Alkoxycarbonylation of Phenols to Benzoate Esters", *J. Chem. Soc. Chem. Commun.*, (1987), pp. 904-905.
Eschavarren, A. M. et al., "Palladium-Catalyzed Carbonylative Coupling of Aryl Triflates with Organostannanes", *J. Am. Chem. Soc.*, (1988), vol. 110, pp. 1557-1565.
Mutin, R. et al., "Bi-Metallic Activation in Homogeneous Catalysis: Pd-Catalysed Carbonylation of Tricarbonyl (chloroarene) chromium Complexes to the Corresponding Aldehydes, Esters, Amides, and Alpha-Oxo Amides", (1988), *J. Chem. Soc., Chem. Commun.*, pp. 896-897.
Scott, W. J., "Pd-Catalysed Coupling Reactions of Chloroaryl CR(CO)$_3$ Complexes", (1987), *J. Chem. Soc., Chem. Commun.*, pp. 1755-1756.

*Primary Examiner*—Harold D. Anderson
*Attorney, Agent, or Firm*—Robert Luke Walker

[57] ABSTRACT

A method for preparing poly(imide-amide)s comprising reacting carbon monoxide, an aromatic or heteroaromatic diamine, and an aromatic or heteroaromatic di(-trifluoromethane sulfonate), in the presence of solvent and a catalyst One of the aromatic reactants has a nucleus including a phthalimide ring system. The catalyst is a compound of a metal selected from the group consisting of platinum, palladium and nickel.

20 Claims, No Drawings

PREPARATION OF AROMATIC POLY(IMIDE-AMIDE)S FROM CO, PRIMARY DIAMINE AND DI(TRIFLUORO METHANE SULFONATE) CONTAINING PHTHALIMIDE GROUP

CROSS-REFERENCE TO RELATED APPLICATIONS

This invention relates to the inventions disclosed in the following U.S. patent applications, which have been cofiled with this application, are commonly assigned and are incorporated herein by reference: METHOD FOR THE PREPARATION OF AROMATIC POLYAMIDES, by Robert J. Perry, U.S. Ser. No. 07/841,929 and METHOD FOR THE PREPARATION OF AROMATIC POLYESTERS, by Robert J. Perry, U.S. Ser. No. 07/841,936.

BACKGROUND OF THE INVENTION

The present invention pertains to methods for preparing aromatic polymers More particularly, the present invention pertains to processes for the preparation of poly(imide-amide)s. Poly(imides-amide)s are generally prepared by the reaction of 4-trimellitoyl anhydride chloride with an appropriate diamine as shown below.

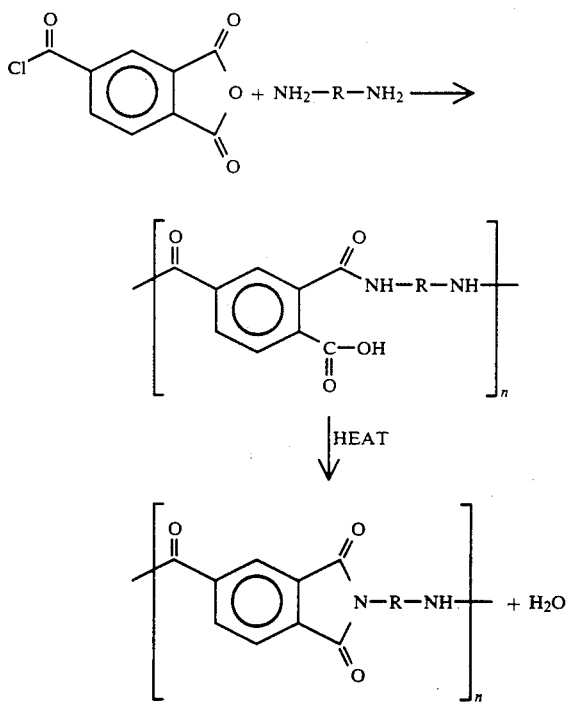

In that procedure, an intermediate polyamic acid is cyclized in an imide forming step with the elimination of water. This procedure presents the shortcomings of using moisture sensitive acid chlorides and driving off a small molecule in the imide forming step, which can create voids and defects in the polymer product. Poly(imides-amide)s produced by this procedure have a backbone of alternating amide and imide units.

Japanese Kokai 123823, published May 16, 1 989, and Yoneyama et. al., *Macromolecules*, Vo. 21, 1988, pp. 1908-1911 disclose the use of a Heck carbonylation reaction, that is, a transition metal catalyzed carbonylation and coupling, in the preparation of low molecular weight polyamides. U.S. Pat. Nos. 4,933,419; 4,933,466 and U.S. Pat. No. 4,933,467 and U.S. Pat. No. 4,933,468 disclose methods which utilize Heck carbonylation reactions to produce esters, imides and imide-amides, respectively.

Amide formation from aryl and vinyl trifluoromethane sulfonates is reported in Ortar, et. al., *Tetrahedron Letters*, Vol. 26, (1985,pp. 1109-1112 pp. 3931-3934.

SUMMARY OF THE INVENTION

It is an object of the invention to provide an improved method for the preparation for aromatic poly(imide-amide)s. In the broader aspects of the invention, there is provided a method for preparing poly(imide-amide)s comprising reacting carbon monoxide, an aromatic or heteroaromatic diamine, and an aromatic or heteroaromatic di(trifluoromethane sulfonate), in the presence of solvent and a catalyst. One of the aromatic reactants has a nucleus including a phthalimide ring system. The catalyst is a compound of a metal selected from the group consisting of platinum, palladium and nickel.

DESCRIPTION OF A SPECIFIC EMBODIMENT

Aromatic poly(imide-amide)s are very widely used as fibers and engineering plastics, in composites and laminates and as films.

In the method of the invention, aromatic poly(imide-amide)s are prepared by the metal-mediated carbonylation and coupling of an aromatic di(trifluoromethane sulfonate) and an aromatic diamine The aromatic di(trifluoromethane sulfonate), which has a nucleus that includes an imide, can be expressed by the general formula

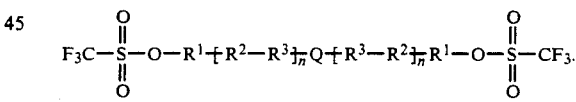

Each $R^1$, $R^2$, $R^3$, is selected independently and n is an independently selected integer from 0 to 4.

$R^1$ is arylene or heteroarylene. In a particular embodiment of the invention, $R^1$ is an aromatic or heteroaromatic moiety having from 1, 2 or 3, five or six membered rings. The rings are solitary or fused and are substituted or unsubstituted. The trifluoromethane sulfonate groups are each non-ortho to other ring substituents. Examples of suitable $R^1$ groups include phenyl, naphthyl, anthraryl, phenanthryl, biphenyl, pyridine, and quinoline.

Q is a ring system of two phthalimide moieties linked by an $R^2$ group, or an imide ring fused to a phthalimide moiety, that is, a pyromellitimide ring system, or Q with one of said $R^1$ groups completes a phthalimide moiety. For example, in a particular embodiment of the invention, the di(aromatic trifluoromethane sulfonate) imide reactant has the general formula

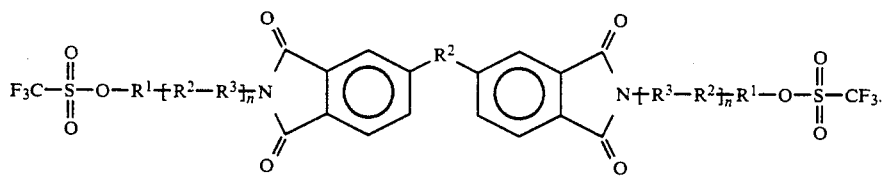

In an alternative embodiment of the invention, the di(aromatic trifluoromethane sulfonate) imide reactant has the general formula

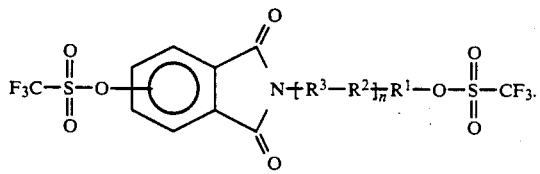

Q and each $R^1$ can be joined by direct links, or alternatively, can be joined by spacers formed by 1 to 4 repeated units having the structure —$R^3$—$R^2$—. $R^2$ is selected from the group consisting of arylene, heteroarylene, fused arylene, alkyl or haloalkyl groups of from 1 to 10 carbons, —O—, —S—,

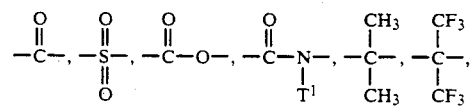

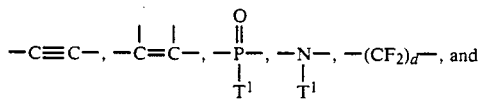

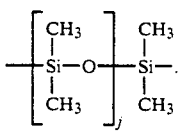

independently selected from the group consisting of alkyl, aryl and heteroaryl; d is an integer from 1 to about 12; and j is an integer between 0 and 300. $R^2$, in addition to acting as a linking group, can provide a selected functionality. Such functionality cannot react in the polymerization reaction, unless it is specifically desired that such reaction occur, in which case chain branching may occur. The selected functionality cannot seriously deactivate the imide compound toward reaction in the polymerization reaction, nor interfere with the reaction in any way.

$R^3$ is selected from the group consisting of alkyl, arylalkyl, arylene, heteroarylene, cycloalkyl. Example $R^3$ groups include: phenyl, biphenyl, naphthalene, anthracene, thiophene, benzothiophene, pyridine, quinoline, furan, dibenzofuran, aromatic sulfones, diarylethers, diarylcarbonyls. These groups can be substituted by one or more alkyl groups, desirably alkyl groups having from 1 to 6 carbon atoms or more desirably methyl, ethyl, propyl and butyl groups. Additional substituents can include phenyl, halogen, hydroxy, amino, alkoxy having from 1 to 6 carbon atoms, and carboxylate groups Substituents of $R^1$, $R^2$, and $R^3$, other than the pair of trifluoromethane sulfonate groups, are "unreactive", that is, they do not have a deleterious effect, for example, steric hindrance or electronic deactivation of the polymerization reaction. Additional substituents can be groups that introduce branching, for example, additional trifluoromethane sulfonate groups, however, branching can affect the rheological and physical properties of the polymer. It is preferred that the total of trifluoromethane sulfonate groups on the aromatic trifluoromethane sulfonate reactant be two.

Examples of specific di(aromatic trifluoromethane sulfonate) imide reactants suitable for the method of this invention include: 4-(trifluoromethanesulfonato)-N-(4-trifluoromethanesulfonatophenyl)phthalimide, 4-(trifluoromethanesulfonato)-N-(3-trifluoromethanesulfonatophenyl)phthalimide, bis{N-(4-trifluoromethanesulfonatophenyl)} pyromellitimide, bis{N-(3-trifluoromethane-sulfonatophenyl)}pyromellitimide, bis(4-{N-(4-trifluoromethanesulfonatophenyl) pyromellitimide})ketone, bis(4-{N-(3- 5 trifluoromethanesulfonatophenyl)pyromellitimide})-ketone, 2,2-bis(4-{N-(4-trifluoromethane-sulfonatophenyl) phthalimide})-hexafluoropropane, 2,2-bis(4-{N-(3-trifluoromethane-sulfonatophenyl)phthalimide})hexafluoropropane, bis(4-{N-(4-trifluoromethanesulfonatophenyl) phthalimide})sulfone, bis(4-{N-(3-trifluoromethanesulfonatophenyl)phthalimide})sulfone, bis(4-{N-(4-trifluoromethanesulfonatophenyl) phthalimide})ether, bis(4-{N-(3-trifluoromethanesulfonatophenyl)phthalimide})ether, bis(4-{N-(4 trifluoromethane-sulfonatophenyl)phthalimide}), bis(4-{N.(3-trifluoromethanesulfonatophenyl)phthalimide}), bis(N-{4-(4-trifluoromethanesulfonatophenoxy) phenyl}pyromellitimide, bis(N-{4-(3-trifluoromethanesulfonatophenoxy)-phenyl}-pyromellitimide, 1,4-bis{N-(4-trifluoromethanesulfonatophthalimide)}benzene, 1,3-bis{N-(4-trifluoromethanesulfonatophthalimide)}benzene, 4-4'-bis{N-(4-trifluoromethane-sulfonatophthalimide)}diphenylether, 4-4'-bis{N-(4-trifluoromethanesulfonatophthalimide)}diphenylsulfone, and 3-4'-bis{N-(4-trifluoromethane-sulfonatophthalimide)}diphenylether.

The method of the invention is not limited to any particular aromatic diamine The aromatic diamine used can include additional functional groups, as long as those groups are "unreactive" in the sense presented above, that is, not having a deleterious effect, for example, steric hindrance or electronic deactivation of the polymerization reaction Additional functional groups on the aromatic diamine can be groups that introduce branching, for example, additional amino groups, however, branching can affect the rheological and physical properties of the polymer and the inclusion of such "branching groups" is not preferred. The aromatic diamine used can be aliphatic or aromatic or heteroaromatic. The particular aromatic diamine selected depends upon the poly(imide-amide) desired.

Suitable aromatic diamines include: 1,4-diaminobenzene, 1,3-diaminobenzene, 4,4'-diaminodiphenylether, 3,4'-diaminodiphenylether, 4,4'-diaminodiphenylmethane, 4,4'-diaminobenzophenone 4,4'-diamino diphenylsulfone, 2,2-bis(4-(4-aminophenoxy)phenyl)-propane, 5-amino-3-(4-aminophenyl)-1,1,3-trimethylindane, 1,4-bis(2-(4-aminophenyl)propyl)benzene, 4,4'-bis(3-aminophenoxy)diphenylsulfone, 1,6-diaminohexane, and bis(3-aminopropyl)tetramethyldisiloxane.

Although reactants are discussed herein as individual compounds, the method of this application is not limited to reactions utilizing individual compounds as reactants, but is also inclusive of reactions utilizing mixtures of compounds as reactants. The method of the invention is not limited to any particular di(aromatic trifluoromethane sulfonate) imide or combination of di(aromatic trifluoromethane sulfonate) imides, nor to any particular aromatic diamine or combination of aromatic diamines, however it is necessary that selected reactants react under the reaction conditions employed to form the aromatic poly(imide-amide). It is desirable that the reactants be sufficiently stable under the reaction conditions employed and that the reactants not be subject to an unacceptable amount of undesirable side reactions, to prevent the formation of an unacceptable amount of by-product. It is also desirable that the reactants be free of groups which unduly retard the reaction by steric hindrance or by lowering the activity of the catalyst.

The reactants are contacted with carbon monoxide. It is convenient to add an excess of carbon monoxide to the reaction zone. The excess of carbon monoxide need not be measured; one can merely pressurize the vessel with carbon monoxide to the desired reaction pressure. Carbon monoxide can be at, or below atmospheric pressure or at a higher pressure.

In the disclosed embodiments of the invention, the reaction step is conducted in the presence of an organic solvent, which appreciably dissolves reactants to provide a liquid reaction medium, which facilitates the contacting of the reactants and the catalyst. It is desirable that the solvent be "inert" to the reaction, i.e., that the solvent not enter into the reaction in an undesired way. The invention is not limited to a particular solvent or solvent system and a wide variety of organic compounds can be used. In a particular embodiment of the invention, exemplary solvents are hydrocarbon solvents, such as toluene and ether solvents, for example: tetrahydrofuran, diglyme (2-methoxyethyl ether), and glyme (1,2-dimethoxyethane). In another embodiment of the invention, a desirable solvent is dipolar and aprotic, that is, the solvent has a highly polar molecule with hydrogens that are not easily abstractable. Exemplary dipolar aprotic solvents include dimethylformamide; dimethylacetamide; dimethylsulfoxide; 1,3-dimethyl-2-imidazolidinone; hexamethylphosphoramide; N-methylpyrrolidinone; N-cyclohexylpyrrolidinone; and dimethylimidazolidinone.

The amount of solvent present is not critical to the reaction, however, it is desirable to use enough solvent to facilitate the reaction. Specific polymers may have optimum concentrations in various solvents. There is no theoretical upper limit on the amount of solvent employed, however, practical limits are imposed by the size of the reaction vessel, the ease of separation of product from the reaction medium, cost and other factors It is ordinarily desirable that the amount of solvent used be within the range of from about 0.1 and about 1000 parts by weigh- based on the volume of imide reactant used. It is also ordinarily desirable that the reaction medium be agitated, for example, by stirring, to facilitate mixing of gaseous carbon monoxide.

The process of the invention is carried out in the presence of a catalyst. The catalyst is a transition metal catalyst in which platinum, nickel or palladium is present in the zero valent or divalent state. Palladium is preferred. The catalysts have one or more ligands bonded to one or more transition metal atoms by ionic or covalent bonds. Representative palladium catalysts include simple palladium salts such as $PdX_2$, in which X is Cl, Br or I and the other palladium catalysts listed in Table 1.

TABLE 1

| Palladium catalysts | |
|---|---|
| $Pd^{+2}$ | |
| $PdX_2L_2$ | X = Cl, Br, I |
| | L = $R_3P$, where R = alkyl or aryl |
| $Pd(OAc)_2$ | OAc = acetate |
| $Pd(OAc)_2L_2$ | OAc = acetate |
| $PdCl_2(RCN)_2$ | R = $CH_3$, Phenyl |
| $PhPdXL_2$ | X = Br, I |
| $PdCl_2(COD)_2$ | COD = cis, cis-1,5-cyclooctadiene |
| $Pd(acac)_2$ | acac = 2,4-pentanedionate |
| $PdCl_2DPPF$ | DPPF = 1,1'-bis(diphenylphosphino)ferrocene |
| $PdCl_2DPPE$ | DPPE = 1,2-bis(diphenylphosphino)ethane |
| $PdCl_2DPPP$ | DPPP = 1,3-(bis(diphenylphosphino)propane |
| $PdCl_2DPPB$ | DPPB = 1,4-bis(diphenylphosphino)butane |
| $Pd^{(0)}$ | |
| $PdL_4$ | L = $R_3P$, where R = alkyl or aryl |

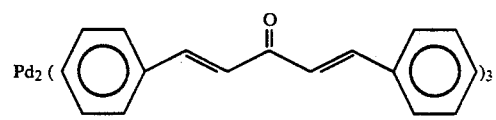

| | |
|---|---|
| $Pd(DPPE)_2$ | DPPE = 1,2-bis(diphenylphosphino)ethane |
| $Pd(DPPP)_2$ | DPPP = 1,3-bis(diphenylphosphino)propane |
| $Pd(DPPB)_2$ | DPPB = 1,4- |

TABLE 1-continued

Palladium catalysts bis(diphenylphosphino)butane

A catalytic amount of catalyst is employed. By "catalytic amount" is meant an amount of catalyst which catalyzes the reaction to the desired extent. Generally, the amount of catalyst is at least about 0.01 mole percent based on the amount of di(aromatic trifluoromethane sulfonate) imide. There is no real upper or lower limit on the amount of catalyst, this being defined by secondary considerations such as cost and ease of separation of the catalyst from products and unreacted reactants. A preferred catalytic amount is from about 0.005 to about 0.20 moles per mole of di(aromatic trifluoromethane sulfonate) imide reactant. The catalyst can be bound to a support or unsupported.

The reaction can take place in the presence of an activating ligand, such as phosphine or arsine ligand. Such a ligand can be used with a catalyst, for example, triphenylphosphine with bis(triphenylphosphine) palladium(II) chloride, to increase the rate of the catalyzed reaction. The amount of ligand used is desirably between about 0.01 mole and about 5.0 moles per mole of metal catalyst, and more desirably at about 2 moles per mole of metal catalyst. It is believed that the presence of the activating ligand speeds up the oxidative addition of such catalysts to the di(aromatic trifluoromethane sulfonate) imide reactant by making the catalyst more nucleophilic.

The process of this invention preferably includes the neutralization of by-product trifluoromethane sulfonic acid, for example, by conducting the reaction in the presence of base. The base can be a tertiary amine such as tributylamine, pyridine, 1,8-diazobicyclo[5,4,0]-7-undecene (DBU), 1,5-diazobicyclo[4,3,0]non-5-ene (DBN) or have the formula:

$NR_3$ wherein each R is independently selected from lower alkyl groups having from about 2 to about 6 carbon atoms. The base can be immobilized on a crosslinked polymer such as cross-linked poly(vinylpyridine) beads. Alternatively, the base can be another type of basic substance which does not react with the reactants, e.g., a metal carbonate such as $K_2CO_3$ or a metal hydroxide such as $Ca(OH)_2$ or a metal acetate such as sodium acetate. Generally, one employes at least enough base to react with the by-product trifluoromethane sulfonic acid produced. An excess can be used, if desired. As with the reactants, solvents and catalysts, a skilled practitioner will recognize that the exact structure of the base is not critical, and the examples of compounds set forth above are merely illustrative and not-limiting examples of materials that can be used in this invention. A skilled practitioner will recognize that other means can be substituted in this invention to achieve similar results.

The process of this invention is preferably conducted at a temperature within the range of from about room temperature, i.e., about 20° C., to about 250° C. A desirable temperature range is from about 70° C. to about 150° C.. A skilled practitioner will recognize that the reaction temperature is not critical, and that temperatures outside this range can be employed, if desired. Generally, one selects a reaction temperature which affords a reasonable rate of reaction and which does not give an undue amount of decomposition of products or reactants.

The reaction time is not a truly independent variable but is dependent at least to some extent on the other reaction parameters selected such as the reactivity of the reactants, activity and amount of catalyst, reaction temperature, pressure and so forth. Generally, reaction times within the range of from about 0.1 to about 100 hours are used.

The aromatic poly(imide-amide)s produced by the method of the invention do not require the addition of salt to the reaction mixture. Salt ran be added to the reaction medium in the methods of the invention. The salt may impart solubility to some polymers, presumably by breaking up hydrogen bonding on the polymer chains. It is desirable to keep the poly(imide-amide) in solution from the standpoint of process efficiency. Suitable salts include salts of lithium such as LiCl, LiBr, and $CaCl_2$.

The method of the invention is not limited by a particular theory or explanation, however, a theoretical explanation can be provided. It is believed that the method of the invention includes the following reaction mechanism sequence, in which the polymer formation step further comprises an oxidative addition step, a carbon monoxide insertion step and a coupling step. In that reaction sequence, a palladium(0) catalyst, which can be introduced as a palladium(0) complex or as a palladium(II) species which is subsequently reduced in situ, undergoes oxidative addition to a trifluoromethane sulfonate compound generating an aryl palladium(II) trifluoromethane sulfonate intermediate. The ligands on palladium can be CO, phosphines or amines. Since the palladium catalyst is present in small quantities relative to the trifluoromethane sulfonate compound, it is unlikely that bis(aryl palladium(II) trifluoromethane sulfonate) intermediates are formed to any great degree, but the oxidative addition reaction takes place at both trifluoromethane sulfonate groups of di(trifluoromethane sulfonate) compounds at some point during the reaction. Then CO insertion generates an acyl palladium(II) trifluoromethane sulfonate complex. This electrophilic acyl palladium complex is then attacked by the aromatic diamine in the coupling reaction. The trifluoromethane sulfonic acid which is liberated is neutralized by the added base and the palladium(0) catalyst is regenerated. This mechanism sequence is illustrated below for the reaction of 4-(trifluoromethanesulfonato)-N-(4-trifluoromethanesulfonatophenyl)phthalimide and 3,4'-diaminodiphenylether.

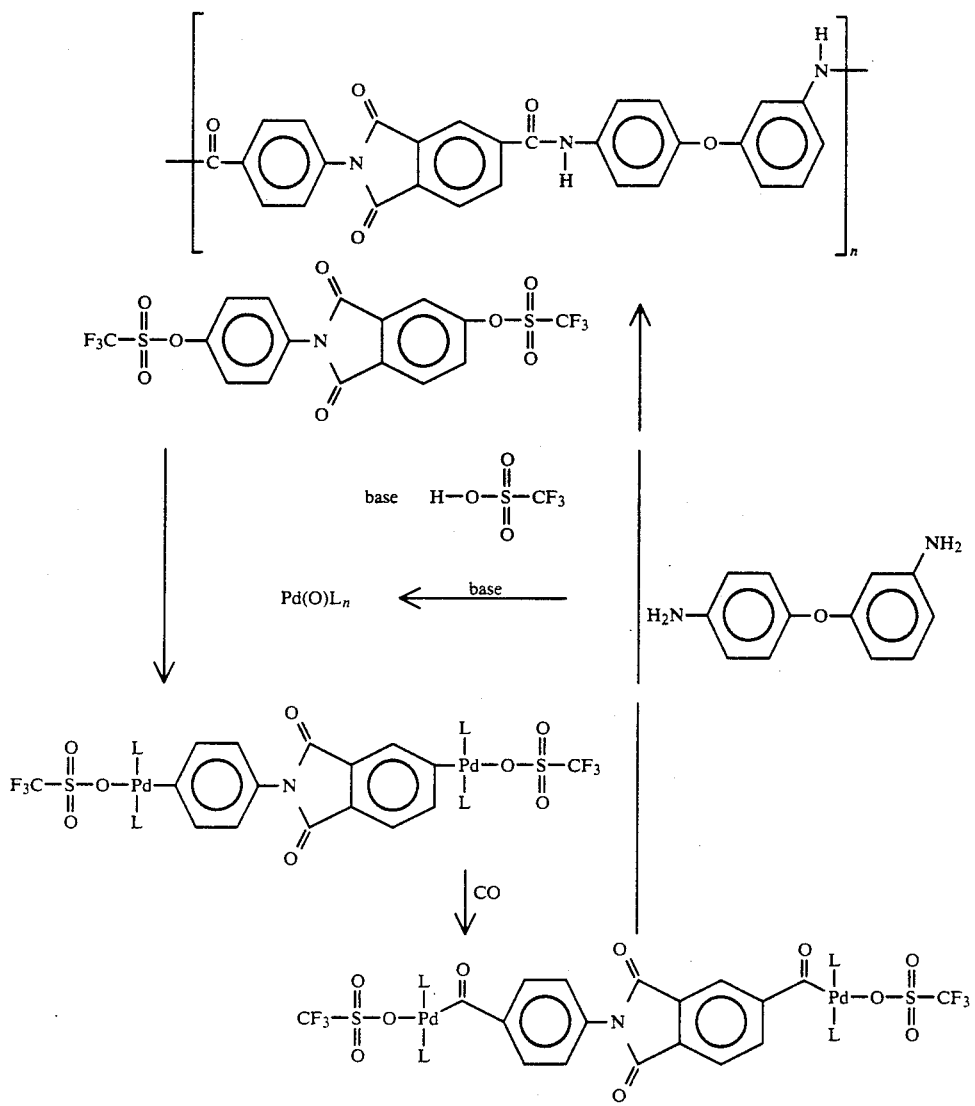

The following Examples are presented for a further understanding of the invention. Table 2 lists reactants and other materials used, quantities and other information for all of the Examples.

EXAMPLE 1

A Fischer-Porter bottle equipped with a Teflon coated stir-bar, a pressure gauges a pressure release valve, a gas inlet and a straight ball valve for degassing and sample withdrawal was charged with di(aromatic trifluoromethane sulfonate) imide reactant, aromatic diamine reactant, catalyst, ligand and solvent, as indicated in Table 2. The reaction mixture was degassed and placed under 1 atmosphere (1 kg/cm$^2$) of carbon monoxide. After stirring for 1 minute at 115° C., the base was added and the reaction vessel was pressurized to 7.7 kg/cm$^2$ with carbon monoxide. The reaction was allowed to continue for 18 hours after which time the mixture was filtered through filter aid, and precipitated into methanol. The polymer was washed extensively with methanol, and dried in vacuo to give 580 milligrams of polymer at a yield of 28%. The inherent viscosity of the polymer was determined by analyzing a 0.25 weight/weight percent solution of the polymer at 25° C. with a Schott Gerate 526-10 viscometer. Infrared spectra were recorded on a Nicolet 5ZDX spectrometer as KBr pellets. Size exclusion chromatography data was obtained from a Waters HPLC using u-styragel columns of 10$^6$, 10$^5$, 10$^4$, 10$^3$ Angstroms calibrated against poly(methylmethacrylate) standards in dimethylformamide to obtain weight average and number average molecular weight determinations (also referred to herein as Mw and Mn, respectively). Results are presented in Table 2.

EXAMPLE 2

The same procedures were followed and results are presented as in Example 1, with the exceptions that reactants differed, as indicated in Table 2 and the reaction was allowed to continue for 18 hours, after which time the mixture was filtered, precipitated into methanol and dried in vacuo to give 1.71 grams of polymer at a yield of 75%.

The same procedures were followed and results are presented as in Example 1, with the exceptions that reactants differed, as indicated in Table 2, the reaction gave 1.59 grams of polymer at a yield of 57%.

EXAMPLE 4

The same procedures were followed and results are presented as in Example 1, with the exceptions that reactants differed, as indicated in Table 2 and the reactants gave 1.55 grams of polymer at a yield of 73%.

EXAMPLE 5

The same procedures were followed and results are presented as in Example 1, with the exceptions that reactants and other reaction conditions differed, as indicated in Table 2.

EXAMPLE 6

The same procedures were followed and results are presented as in Example 1, with the exceptions that reactants and other reaction conditions differed, as indicated in Table 2.

TABLE 2

| EXAMPLE | 1 | 2 | 3 | 4 | 5 | 6 |
|---|---|---|---|---|---|---|
| Di(aromatic trifluoromethane sulfonate) imide concentration (millimolar) | | | | | | |
| 2,2-bis(4-{N-(4-trifluoromethane sulfonate)phenyl} phthalimide) hexafluoropropane | 3.00 | — | — | — | — | — |
| bis(4-{N-(4-trifluoromethane sulfonate)phenyl} phthalimide) sulfone | — | 3.00 | — | — | 2.50 | — |
| bis(4-{N-(4-trifluoromethane sulfonate)phenyl} phthalimide)ether | — | — | 3.00 | — | — | — |
| 4-(trifluoromethane sulfonato)-N-(4-trifluoromethane sulfonatophenyl) phthalimide | — | — | — | 3.00 | — | 5.00 |
| Aromatic diamine concentration (millimolar) | | | | | | |
| 4,4'-diamino diphenylether | 3.00 | 3.00 | — | — | — | — |
| 2,2-bis{4-(4-aminophenoxy) phenyl}propane | — | — | 3.00 | — | 2.50 | — |
| 4,4'-bis(3-aminophenoxy) diphenylsulfone | — | — | — | 3.00 | — | — |
| 3,4'-diamino diphenylether | — | — | — | — | — | 5.00 |
| Solvent volume (in milliliters) | | | | | | |
| Dimethylacetamide | 10.0 | 9.0 | 9.0 | 9.0 | 32.0 | 32.0 |
| Catalyst concentration (millimolar) | | | | | | |
| PdCl$_2$DPPE | 0.09 | — | — | — | — | — |
| Pd(II)acetate | — | 0.09 | 0.09 | 0.09 | — | — |
| PdCl$_2$(PPh$_3$)$_2$ | — | — | — | — | 0.07 | 0.14 |
| Ligand concentration (millimolar) | | | | | | |
| DPPE | 0.09 | — | — | — | — | — |
| DPPB | — | 0.18 | 0.18 | 0.18 | — | — |
| PPh$_3$ | — | — | — | — | 0.38 | 0.76 |
| Base concentration (millimolar) | | | | | | |
| 1,8-diazabicyclo [5.4.0] undec-7-ene (DBU) | 7.2 | 7.2 | 7.2 | 7.2 | 6.0 | 12.0 |
| Temperature (°C.) | 115° | 115° | 115° | 115° | 100° | 100° |
| CO pressure (kg/cm$^2$) | 7.4 | 7.7 | 7.7 | 7.7 | 2.1 | 7.4 |
| Reaction time (in hours) | 18 | 19.5 | 19.5 | 19.5 | 24 | 24 |

Table 3 shows proposed repeating unit structural formulas of polymers produced by the method of the invention.

TABLE 3

| Example | Poly(imide-amide) repeating unit |
|---------|----------------------------------|
| 1 | |
| 2 | |
| 3 | |
| 4 | |
| 5 | |

TABLE 3-continued
| Example | Poly(imide-amide) repeating unit |
|---|---|
| 6 | 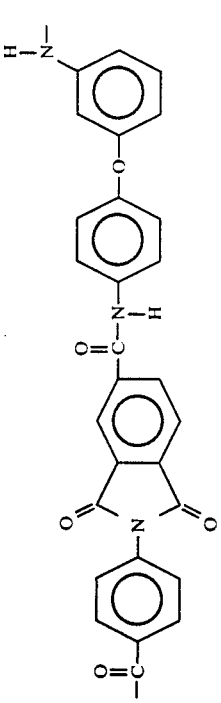 |

The method of the invention provides the advantages of utilizing di(aromatic trifluoromethane sulfonate) imides. These compounds are much less water sensitive than diacid chlorides. The method of the invention can be carried out at a temperature between 100° and 120° C.

While specific embodiments of the invention have been shown and described herein for purposes of illustration, the protection afforded by any patent which may issue upon this application is not strictly limited to a disclosed embodiment; but rather extends to all modifications and arrangements which fall fairly within the scope of the claims which are appended hereto.

What is claimed is:

1. A method for preparing poly(imide-amide)s comprising reacting carbon monoxide, a primary diamine, and an aromatic or heteroaromatic di(trifluoromethane sulfonate), wherein said aromatic reactant has a nucleus including a phthalimide ring system, in the presence of solvent and catalyst, said catalyst being selected from the group consisting of platinum compounds, palladium compounds, and nickel compounds.

2. The method of claim 1 wherein each said trifluoromethane sulfonate group, is non-ortho.

3. The method of claim 1 further comprising neutralizing trifluoromethane sulfonic acid.

4. The method of claim 1 wherein said di(trifluoromethane sulfonate) reactant has the general structure $$F_3C-\underset{O}{\overset{O}{\underset{\|}{\overset{\|}{S}}}}-O-R^1\!+\!R^2\!-\!R^3\!\!\xrightarrow{}_{\!n}\!Q\!+\!R^3\!-\!R^2\!\!\xrightarrow{}_{\!n}\!R^1\!-\!O-\underset{O}{\overset{O}{\underset{\|}{\overset{\|}{S}}}}-CF_3,$$

wherein each $R^1$, $R^2$, $R^3$, and n is independently selected, n is an integer from 0 to 4

$R^1$ is selected from the group consisting of aromatic and heteroaromatic moieties having a total of ring carbons and heteroatoms of from 6 to about 20, $R^2$ is selected from the group consisting of —O—, —S—, $-\overset{O}{\overset{\|}{C}}-$, $-\overset{O}{\underset{\|}{\overset{\|}{S}}}-$, $-\overset{O}{\overset{\|}{C}}-O-$, $-\overset{O}{\overset{\|}{C}}-\underset{R^5}{N}-$, $-\underset{CH_3}{\overset{CH_3}{C}}-$, $-\underset{CF_3}{\overset{CF_3}{C}}-$, $-C\equiv C-$, $-\underset{|}{C}=\underset{|}{C}-$, $-\underset{R^5}{\overset{O}{\overset{\|}{P}}}-$, $-\underset{R^5}{N}-$, $-(CF_2)_m-$, and $$\left[\begin{array}{c}CH_3\\|\\Si-O\\|\\CH_3\end{array}\right]_j\begin{array}{c}CH_3\\|\\Si-,\\|\\CH_3\end{array}$$

wherein each $R^5$ is independently selected from the group consisting of alkyl and aryl, m is an integer from 1-12, and j is an integer from 0 to 300, $R^3$ is selected from the group consisting of alkyl, arylalkyl, arylene, heteroarylene, cycloalkyl, and Q is a ring system of two linked phthalimide moieties, or a pyromellitimide ring system, or Q with one of said $R^1$ or $R^3$ groups completes a phthalimide moiety.

5. The method of claim 1 wherein said di(trifluoromethane sulfonate) reactant has the general formula $$F_3C-\underset{O}{\overset{O}{\underset{\|}{\overset{\|}{S}}}}-O-R^1\!+\!R^2\!-\!R^3\!\!\xrightarrow{}_{\!n}\!N\underset{\underset{O}{\overset{\|}{C}}\diagdown}{\overset{\overset{O}{\overset{\|}{C}}\diagup}{}}R^4\underset{\underset{O}{\overset{\|}{C}}\diagup}{\overset{\overset{O}{\overset{\|}{C}}\diagdown}{}}N\!+\!R^3\!-\!R^2\!\!\xrightarrow{}_{\!n}\!R^1\!-\!O-\underset{O}{\overset{O}{\underset{\|}{\overset{\|}{S}}}}-CF_3$$

wherein each $R^1$, $R^2$, $R^3$, and n is independently selected, n is an integer from 0 to 4, $R^1$ is selected from the group consisting of aromatic and heteroaromatic moieties having a total of ring carbons and heteroatoms of from 6 to about 20, $R^2$ is selected from the group consisting of —O—, —S—, $-\overset{O}{\overset{\|}{C}}-$, $-\overset{O}{\underset{\|}{\overset{\|}{S}}}-$, $-\overset{O}{\overset{\|}{C}}-O-$, $-\overset{O}{\overset{\|}{C}}-\underset{R^5}{N}-$, $-\underset{CH_3}{\overset{CH_3}{C}}-$, $-\underset{CF_3}{\overset{CF_3}{C}}-$, $-C\equiv C-$, $-\underset{|}{C}=\underset{|}{C}-$, $-\underset{R^5}{\overset{O}{\overset{\|}{P}}}-$, $-\underset{R^5}{N}-$, $-(CF_2)_m-$, and $$\left[\begin{array}{c}CH_3\\|\\Si-O\\|\\CH_3\end{array}\right]_j\begin{array}{c}CH_3\\|\\Si-,\\|\\CH_3\end{array}$$

wherein each $R^5$ is independently selected from the group consisting of alkyl and aryl, m is an integer from 1-12, and j is an integer from 0 to 300, $R^3$ is selected from the group consisting of alkyl, arylalkyl, arylene, heteroarylene, cycloalkyl, and $R^4$ is selected from the group consisting of

[phenylene] and [phenylene–$R^2$–phenylene]

6. The method of claim 1 wherein said di(trifluoromethane sulfonate) reactant has the general formula $$F_3C-\underset{O}{\overset{O}{\underset{\|}{\overset{\|}{S}}}}-O-[\text{phthalimide}]N\!+\!R^3\!-\!R^2\!\!\xrightarrow{}_{\!n}\!R^1\!-\!O-\underset{O}{\overset{O}{\underset{\|}{\overset{\|}{S}}}}-CF_3$$

wherein each $R^1$, $R^2$, $R^3$, and n is independently selected, n is an integer from 0 to 4, $R^1$ is selected from the group consisting of aromatic and heteroaromatic moieties having a total of ring carbons and heteroatoms of from 6 to about 20, $R^2$ is selected from the group consisting of —O—, —S—,

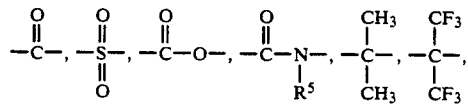

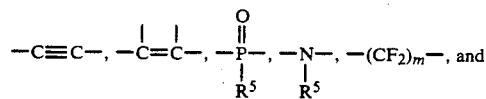

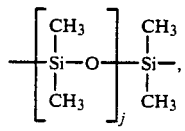

wherein each $R^5$ is independently selected from the group consisting of alkyl and aryl, m is an integer from 1-12, and j is an integer from 0 to 300, and $R^3$ is selected from the group consisting of alkyl, arylalkyl, arylene, heteroarylene, cycloalkyl.

7. The method of claim 1 wherein said di(trifluoromethane sulfonate) reactant is selected from the group consisting of 4-(trifluoromethanesulfonato)-N-(4-trifluoromethanesulfonatophenyl)phthalimide, 4-(trifluoromethanesulfonato)-N-(3-trifluoromethanesulfonatophenyl)phthalimide, bis(N-(4-trifluoromethanesulfonatophenyl)}pyromellitimide, bis{N-(3-trifluoromethane-sulfonatophenyl)}pyromellitimide, bis(4-{N-(4-trifluoromethanesulfonatophenyl) pyromellitimide})ketone, bis(4-{N-(3-trifluoromethanesulfonatophenyl)pyromellitimide})-ketone, 2,2-bis(4-{N-(4-trifluoromethanesulfonatophenyl) phthalimide})hexafluoropropane, 2,2-bis(4-{N-(3-trifluoromethanesulfonatophenyl)phthalimide})hexafluoro propane, bis(4-{N-(4-trifluoromethanesulfonatophenyl) phthalimide})-sulfone, bis(4-{N-(3-trifluoromethanesulfonatophenyl)phthalimide})sulfone, bis(4-{N-(4-trifluoromethanesulfonatophenyl) phthalimide})ether, bis(4-{N-(3-trifluoromethanesulfonatophenyl)phthalimide})ether, bis(4-{N-(4-trifluoromethane-sulfonatophenyl)phthalimide}), bis(4-{N-(3-trifluoromethanesulfonatophenyl)phthalimide}), bis(N-(4-(4-trifluoromethanesulfonatophenoxy) phenyl}pyromellitimide, bis(N-{4-(3-trifluoromethanesulfonatophenoxy)phenyl-pyromellitimide, 1,4-bis{N-(4-trifluoromethane-sulfonatophthalimide)} benzene, 1,3-bis[N-(4-trifluoromethanesulfonatophthalimide)}benzene, 4,4'-bis{N-(4-trifluoromethane-sulfonatophthalimide)}diphenylether, 4,4'-bis{N-(4-trifluoromethanesulfonatophthalimide)} diphenylsulfone, and 3-4'-bis{N-(4-trifluoromethane-sulfonatophthalimide)}diphenylether.

8. The method of claim 1 wherein said aromatic diamine reactant is selected from the group consisting of: 1,4 diaminobenzene; 1,3 diaminobenzene; 4,4'-diaminobenzophenone; 4,4'-diaminodiphenyl-methane; 2,2-bis(4-aminophenyl)propane; 9,9-bis(4-aminophenyl)fluorene; 4,4'-diamino-diphenylether; 1,4[2-(4-aminophenyl)-2-propyl]benzene; 5-amino-3-(4-aminophenyl)-1,1,3-trimethylindane; 2,2'-bis(trifluoromethyl)-4,4'-diaminodiphenyl; 3,4'-diaminodiphenylether; 4,4'-bis(4-aminophenoxy)biphenyl; 2,2-bis[4-(4-aminophenoxy)-phenyl]prepare; 1,4-bis(4-aminophenoxy)benzene; 3,3'-diamino-diphenylsulfone; 4,4'-diamino-diphenylsulfone; 2,2'-bis[4-(4-aminophenoxy)-phenyl]sulfone; 3,5-diamimo-t-butyl-benzene: 2,2-bis[4-(3-aminophenoxy)-phenyl]sulfone;

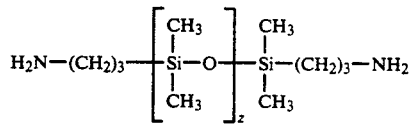

wherein z is an integer from 1 to about 50; $H_2N-(CH_2)_y$-N2, wherein y is an integer from 1 to 10.

9. The method of claim 1 wherein said catalyst is a palladium compound.

10. The method of claim 1 wherein said catalyst is a palladium compound having a palladium atom in the zero valent or divalent state.

11. The method of claim 1 wherein said catalyst is selected from the group consisting of $PdCl_2$, $PdBr_2$, $PdI_2$, $PdCl_2(Z^1 3P)_2$, $PdBr_2(Z^1 3P)_2$, $PdI_2(Z^1 3P)_2$, $Pd(Z^2)_2$, $Pd(Z^2)_2(Z^1 3P)_2$, $PdCl_2(Z^3 CN)_2$, $PhPdBr(Z^1 3P)_2$, $PhPdI(Z^1 O)_2$, $PdCl_2(cis, cis-1,5-cyclooctadiene)_2$, $Pd(2,4-pentanedionate)2$, $PdCl_2$ (1,1'-bis(diphenylphosphino) ferrocene),$PdCl_2$[1,2-bis (diphenylphosphino)ethane), $PdCl_2(1,3-bis(diphenylphosphino)propane)$, $PdCl_2(1,4-bis(diphenylphosphino)butane)$, $Pd(Z^1 O)_4$,

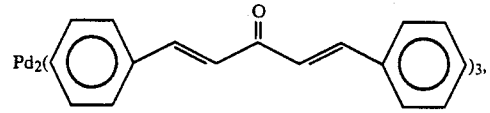

$Pd(1,2-bis(diphenylphosphino)ethane)_2$,
$Pd(1,3-bis(diphenylphosphino)propane)_2$, and
$Pd(1,4-bis(diphenylphosphino)butane)_2$, wherein $Z^1$ is alkyl or aryl, $Z^2$ is acetate, and $Z^3$ is $CH_3$ or phenyl.

12. The method of claim 11 wherein said di(trifluoromethane sulfonate) reactant is selected from the group consisting of 4-(trifluoromethanesulfonato)-N-(4-trifluoromethanesulfonatophenyl)phthalimide, 4-(trifluoromethanesulfonato)-N-(3-trifluoromethanesulfonatophenyl)phthalimide, bis{N-(4-trifluoromethanesulfonatophenyl)}pyromellitimide, bis{N-(3-trifluoromethane-sulfonatophenyl)}pyromellitimide, bis(4-{N-(4-trifluoromethanesulfonatophenyl) pyromellitimide})ketone, bis(4-{N-(3-aminophenoxy)-phenyl]sulfone; trifluoromethanesulfonatophenyl)pyromellitimide})ketone, 2,2-bis(4-{N-(4-trifluoromethane-sulfonatophenyl)phthalimide})hexafluoropropane, 2,2-bis(4-{N-(3-trifluoromethane-sulfonatophenyl)phthalimide})hexafluoropropane, bis(4-{N-(4-trifluoromethanesulfonatophenyl) phthalimide})sulfone, bis(4-{N-(3-trifluoromethanesulfonatophenyl)phthalimide})sulfone, bis(4-{N-(4-trifluoromethanesulfonatophenyl) phthalimide})ether, bis(4-{N-(3-trifluoromethanesulfonatophenyl)phthalimide})ether, bis(4-{N-(4-trifluoromethane-sulfonatophenyl)phthalimide}), bis(4-{N-(3-trifluoromethanesulfonatophenyl)phthalimide}), bis(N-{4-(4-trifluoromethanesulfonatophenoxy) phenyl}pyromellitimide, bis(N-{4-(3-trifluoromethanesulfonatophenoxy)phenyl}pyromellitimide, 1,4-bis{N-(4-trifluoromethanesulfonatophthalimide)} benzene, 1,3-bis{N-(4-trifluoromethane-sulfonatophthalimide)}benzene, 4-4'-bis{N-(4-4'-bis{N-(4-trifluoromethanesulfonatophthalimide)} diphenylsulfone, and 3-4'-bis{N-(4-trifluoromethanesulfonatophthalimide)}diphenylether and said aromatic diamine reactant is selected from the group consisting of: 1,4diaminobenzene; 1,3 diaminobenzene; 4,4'-diaminobenzophenone; 4,4'-diaminodiphenyl-methane; 2,2-bis(4-aminophenyl)propane; 9,9-bis(4-aminophenyl)fluorene; 4,4'-diaminodiphenylether; 1,4[2-(4-aminophenyl)-2-propyl]benzene; 5-amino-3-(4-aminophenyl)-1,1,3-trimethylindane; 2,2'-bis(trifluoro-methyl)-4,4'-diaminodiphenyl; 3,4'-diaminodiphenylether; 4,4'-bis(4-aminophenoxy)biphenyl; 2,2-bis[4-(4-aminophenoxy)-phenyl]propane; 1,4-bis(4-aminophenoxy)benzene; 3,3'-diamino-diphenylsulfone; 4,4'-diamino-diphenylsulfone; 2,2'-bis[4-(4-aminophenoxy)-phenyl]sulfone; 3,5-diamino-t-butylbenzene; benzene; 2,2-bis[4-(3-aminophenoxy)-phenyl]sulfone;

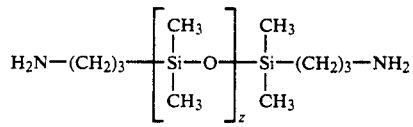

wherein z is an integer from 1 to about 50; $H_2N\text{-}(CH_2)_y\text{-}NH_2$, wherein y is an integer from 1 to 10.

13. The method of claim 1 comprising reacting at a carbon monoxide pressure greater than about 1 kilograms per square centimeter.

14. The method of claim 1 comprising reacting at a temperature from about 70° to about 150° C.

15. A method for preparing poly(imide amide)s in the presence of solvent and catalyst selected from the group consisting of platinum compounds, palladium compounds, and nickel compounds, comprising reacting carbon monoxide, an aromatic diamine and a di(trifluoromethane sulfonate) reactant having the general structure

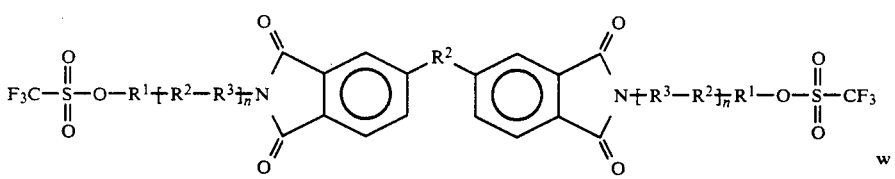

for the formulas herein each X, $R^1$, $R^2$, $R^3$, $R^4$, and n is independently selected and X is a nonortho halide selected from the group consisting of —Br and —I, n is an integer from 0 to 4, $R^1$ is arylene or heteroarylene, $R^2$ is selected from the group consisting of —O—, —S—,

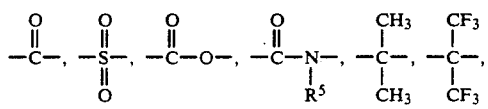

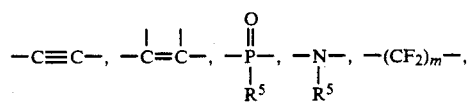

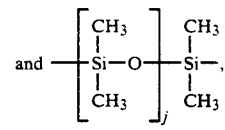

wherein each $R^5$ is independently selected from the group consisting of alkyl and aryl, m is an integer from 1–12, and j is an integer from 0 to 300, $R^3$ is selected from the group consisting of alkyl, arylalkyl, arylene, heteroarylene.

16. The method of claim 15 further comprising neutralizing trifluoromethane sulfonic acid.

17. The method of claim 16 wherein said catalyst is selected from the group consisting of $PdCl_2$, $PdBr_2$, $PdI_2$, $PdCl_2(A^1O)_2$, $PdBr_2Z^{13}P)_2$, $PdI_2(Z^{13}P)_2$, $Pd(Z^2)_2$, $Pd(Z^2)_2(Z^1O)_2$, $PdCl_2(Z^3CN)_2$, $PhPdBr(Z^{13}P)_2$, $PhPdI(Z^{13}P)_2$, $PdCl_2(cis, cis\text{-}1,5\text{-}cycloctadiene)_2$, $Pd(2,4\text{-pentanedionate})_2$, $PdCl_2(1,1'\text{-bis(diphenylphosphino) ferrocene})$, $PdCl_1(1,2'\text{-bis(diphenylphosphino)ethane})$,
$PdCl_2(1,3\text{-bis(diphenylphosphino)propane})_2$,
$PdCl_2(1,4\text{-bis(diphenylphosphino)propane})_2$, and $Pd(Z^{13}P)_4$,

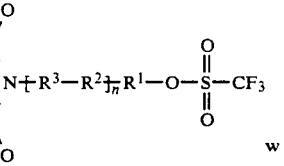

$Pd(1,2\text{-bis(diphenylphosphino)ethane})_2$,
$Pd(1,3\text{-bis(diphenylphosphino)propane})_2$, and
$Pd(1,4\text{-bis(diphenylphosphino)butane})_2$,
wherein $Z^1$ is alkyl or aryl, $Z^2$ is acetate, and $Z^3$ is $CH_3$ or phenyl.

18. A method for preparing poly(imideamide)s in the presence of solvent and catalyst selected from the group consisting of platinum compounds, palladium compounds, and nickel compounds, comprising reacting carbon monoxide, an aromatic diamine and a di(trifluoromethane sulfonate) reactant having the general structure

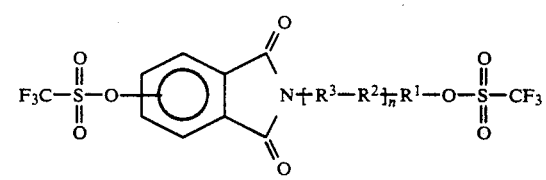

wherein for the formulas herein each X, $R^1$, $R^2$, $R^3$, $R^4$, and n is independently selected and group consisting of —Br and —I, n is an integer from 0 to 4, $R^1$ is arylene or heteroarylene, $R^2$ is selected from the group consisting of —O—, —S—,

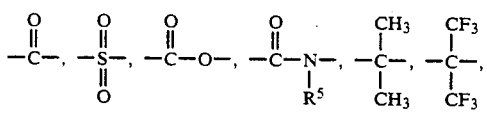

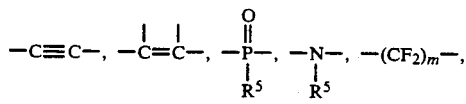

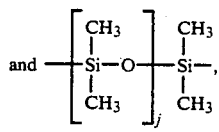

wherein each $R^5$ is independently selected from the group consisting of alkyl and aryl, m is an integer from 1-12, and j is an integer from 0 to 300, and $R^3$ is selected from the group consisting of alkyl, arylalkyl, arylene, heteroarylene.

19. The method of claim 18 further comprising neutralizing trifluoromethane sulfonic acid.

20. The method of claim 19 wherein said catalyst is selected from the group consisting of $PdCl_2$, $PdBr_2$, $PdI_2$, $PdCl_2(Z^13P)_2$, $PdBr_2(Z^1O)_2$, $PdI_2(Z^1O)_2$, $Pd(Z^2)_2$, $Pd(Z^2)_2(Z^13P)_2$, $PdCl_2(ZCN)_2$, $PhPdBr(Z^13P)_2$, $PhPdI(Z^1O)_2$, $PdCl_2(cis-1,5-cyclocctadiene)_2$, $Pd(2,4$-pentanedionate$)_2$, $PdCl_2(1,1'$-bis(diphenylphosphino) ferrocene$)$,$PdCl_2(1,2$-bis(diphenylphosphino)ethane$)$,
$PdCl_2(1,3$-bis(diphenylphosphino)propane$)$,
$PdCl_2(1,4$-bis(diphenylphosphino)butane$)$,
$Pd(Z^1O)_4$,

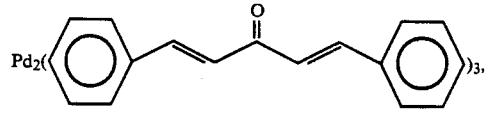

$Pd(1,2$-bis(diphenylphosphino)ethane$)_2$,
$Pd(1,3$-bis(diphenylphosphino)propane$)_2$, and
$Pd(1,4$-bis(diphenylphosphino)butane$)_2$,
wherein $Z^1$ is alkyl or aryl, $Z^2$ is acetate, and $Z^3$ is $CH_3$ or phenyl.

* * * * *

UNITED STATES PATENT AND TRADEMARK OFFICE
CERTIFICATE OF CORRECTION

PATENT NO.  : 5,214,123

DATED       : May 25, 1993

INVENTOR(S) : Robert J. Perry, et al

Page 1 of 4

It is certified that error appears in the above-indentified patent and that said Letters Patent is hereby corrected as shown below:

Column 19, line 3 reads: "15n is an integer from 0 to 4,"
   line 3 should read:   --n is an integer from 0 to 4,--

Column 20, line 1 reads: "methyl)-4,4'-diaminodiphenyl; 3,4'-diaminodiphen-"
   line 1 should read: --methyl)-4,4'-diaminobiphenyl; 3,4'-diaminodiphen- --

Column 20, line 3, reads: "aminophenoxy)-phenyl]prepare; 1,4-bis(4-amino-"
   line 3 should read: --aminophenoxy)-phenyl]propane; 1,4-bis(4-amino- --

Column 20, line 16 reads: "N2, wherein y is an integer from 1 to 10."
   line 16 should read: --NH2, wherein y is an integer from 1 to 10.--

Column 20, line 25 reads: "$PdI_2$, $PdCl_2(Z^13P)_2$, $PdBr_2(Z^13P)_2$, $PdI_2(Z^13P)_2$,"
   line 25 should read: --$PdI_2$, $PdCl_2(Z^1_3P)_2$, $PdBr_2(Z^1_3P)_2$, $PdI_2(Z^1_3P)_2$,--

Column 20, line 26 reads: "$Pd(Z^2)_2$, $Pd(Z^2)_2(Z^13P)_2$, $PdCl_2(Z^3CN)_2$,"
   line 26 should read: --$Pd(Z^2)_2$, $Pd(Z^2)_2(Z^1_3P)_2$, $PdCl_2(Z^3CN)_2$,--

Column 20, line 27 reads: "$PhPdBr(Z^13P)_2$, $PhPdI(Z^1O)_2$, $PdCl_2$(cis, cis-1,5-"
   line 27 should read: --$PhPdBr(Z^1_3P)_2$, $PhPdI(Z^1_3P)_2$, $PdCl_2$(cis, cis-1,5- --

Column 20, line 28 reads: "cycloctadiene)$_2$, Pd(2,4-pentanedionate)2, $PdCl_2$(1,1'-"
   line 28, should read, "cyclooctadiene)2 , Pd(2,4-pentanedionate)$_2$, $PdCl_2$ (1,1'- --

UNITED STATES PATENT AND TRADEMARK OFFICE
CERTIFICATE OF CORRECTION

PATENT NO. : 5,214,123

DATED : May 25, 1993

INVENTOR(S) : Robert J. Perry, et al

It is certified that error appears in the above-indentified patent and that said Letters Patent is hereby corrected as shown below:

Column 20, line 33 reads: "$Pd(Z^1O)_4$,"
    line 33 should read: --$Pd(Z^1_3P)_4$,--

Column 20, lines 55-56 reads: "litimide})ketone, bis(4-{N-(3-aminophenoxy)-phenyl]-sulfone; trifluoromethanesulfonatophenyl)pyromel-"
    lines 55-56 should read: "litimide})ketone, bis(4-{N-(3-trifluoromethanesulfonatophenyl)pyromel- --

Column 21, line 15 reads: "2,2'-bis(trifluoro-methyl)-4,4'-diaminodiphenyl; 3,4'-"
    line 15 should read: --2,2'-bis(trifluoro-methyl)-4,4'-diaminodiphenyl; 3,4'- --

Column 21, line 21 reads: "benzene; 2,2-bis[4-(3-aminophenoxy)-phenyl]sulfone;"
    line 21 should read: --2,2-bis[4-(3-aminophenoxy)-phenyl]sulfone;--

Column 22, line 18 reads: "$PdI_2$, $PdCl_2(A^1O)_2$, $PdBr_2(Z^1_3P)_2$, $PdI_2(Z^1_3P)_2$,"
    line 18 should read: --$PdI_2$, $PdCl_2(Z^1_3P)_2$, $PdBr_2(Z^1_3P)_2$, $PdI_2(Z^1_3P)_2$,--

Column 22, line 19 reads: "$Pd(Z^2)_2$, $Pd(Z^2)_2(Z^1O)_2$, $PdCl_2(Z^3CN)_2$,"
    line 19 should read: --$Pd(Z^2)_2$, $Pd(Z^2)_2(Z^1_3P)_2$, $PdCl_2(Z^3CN)_2$,--

Column 22, line 20 reads: "$PhPdBr(Z^1_3P)_2$, $PhPdI(Z^1_3P)_2$, $PdCl_2$(cis, cis-1,5-"
    line 20 should read: --$PhPdBr(Z^1_3P)_2$, $PhPdI(Z^1_3P)_2$, $PdCl_2$(cis, cis-1,5- --

UNITED STATES PATENT AND TRADEMARK OFFICE
CERTIFICATE OF CORRECTION

PATENT NO. : 5,214,123  
DATED : May 25, 1993  
INVENTOR(S) : Robert J. Perry, et al Page 3 of 4

It is certified that error appears in the above-indentified patent and that said Letters Patent is hereby corrected as shown below:

Column 22, line 22 reads: "bis(diphenylphosphino) ferrocene), $PdCl_1(1,2'$-bis(di-"
    line 22 should read: --bis(diphenylphosphino) ferrocene), $PdCl_2(1,2$-bis(di- --

Column 22, line 24 reads: "$PdCl_2(1,3$-bis(diphenylphosphino)propane$)_2$,"
    line 24 should read: --$PdCl_2(1,3$-bis(diphenylphosphino) propane),--

Column 22, line 25 reads: "$PdCl_2(1,4$-bis(diphenylphosphino)propane$)_2$, and"
    line 25 should read: --$PdCl_2(1,4$-bis(diphenylphosphino)butane),--

Column 22, line 26 reads: "$Pd(Z^13P)_4$,"
    line 26 should read: --$Pd(Z^1{}_3P)_4$,--

Column 22, line 65 reads: "and n is independently selected and group consisting of"
    line 65, --"X is a nonortho halide selected from the-- should be inserted after the word "and"

Column 24, line 5 reads: "$PdI_2$, $PdCl_2(Z^1{}_3P)_2$, $PdBr_2(Z^1O)_2$, $PdI_2(Z^1O)_2$,"
    line 5 should read: --$PdI_2$, $PdCl_2(Z^1{}_3P)_2$, $PdBr_2(Z^1{}_3P)_2$, $PdI_2(Z^1{}_3P)_2$,--

Column 24, line 6 reads: "$Pd(Z^2)_2$, $Pd(Z^2)_2(Z^1{}_3P)_2$, $PdCl_2(ZCN)_2$,"
    line 6 should read: --$Pd(Z^2)_2$, $Pd(Z^2)_2(Z^1{}_3P)_2$, $PdCl_2(Z^3CN)_2$,--

Column 24, line 7 reads: "$PhPdBr(Z^1{}_3P)_2$, $PhPdI(Z^1O)_2$, $PdCl_2$(cis-1,5-cycloc-"
    line 7 should read: --$PhPdBr(Z^1{}_3P)_2$, $PhPdI(Z^1{}_3P)_2$, $PdCl_2$(cis,cis-1,5-cycloc- --

UNITED STATES PATENT AND TRADEMARK OFFICE
CERTIFICATE OF CORRECTION

PATENT NO. : 5,214,123
DATED : May 25, 1993
INVENTOR(S) : Robert J. Perry, et al It is certified that error appears in the above-indentified patent and that said Letters Patent is hereby corrected as shown below:

Column 24, line 13 reads: "$Pd(Z^1O)_4$,"
line 13 should read: --$Pd(Z^1{}_3P)_4$,--

Signed and Sealed this

Twelfth Day of April, 1994

*Attest:*

BRUCE LEHMAN

*Attesting Officer*

*Commissioner of Patents and Trademarks*